Jan. 17, 1939.  A. M. BUEHLER  2,144,142
MATERIAL DISTRIBUTING APPARATUS
Filed Feb. 25, 1937   2 Sheets-Sheet 2
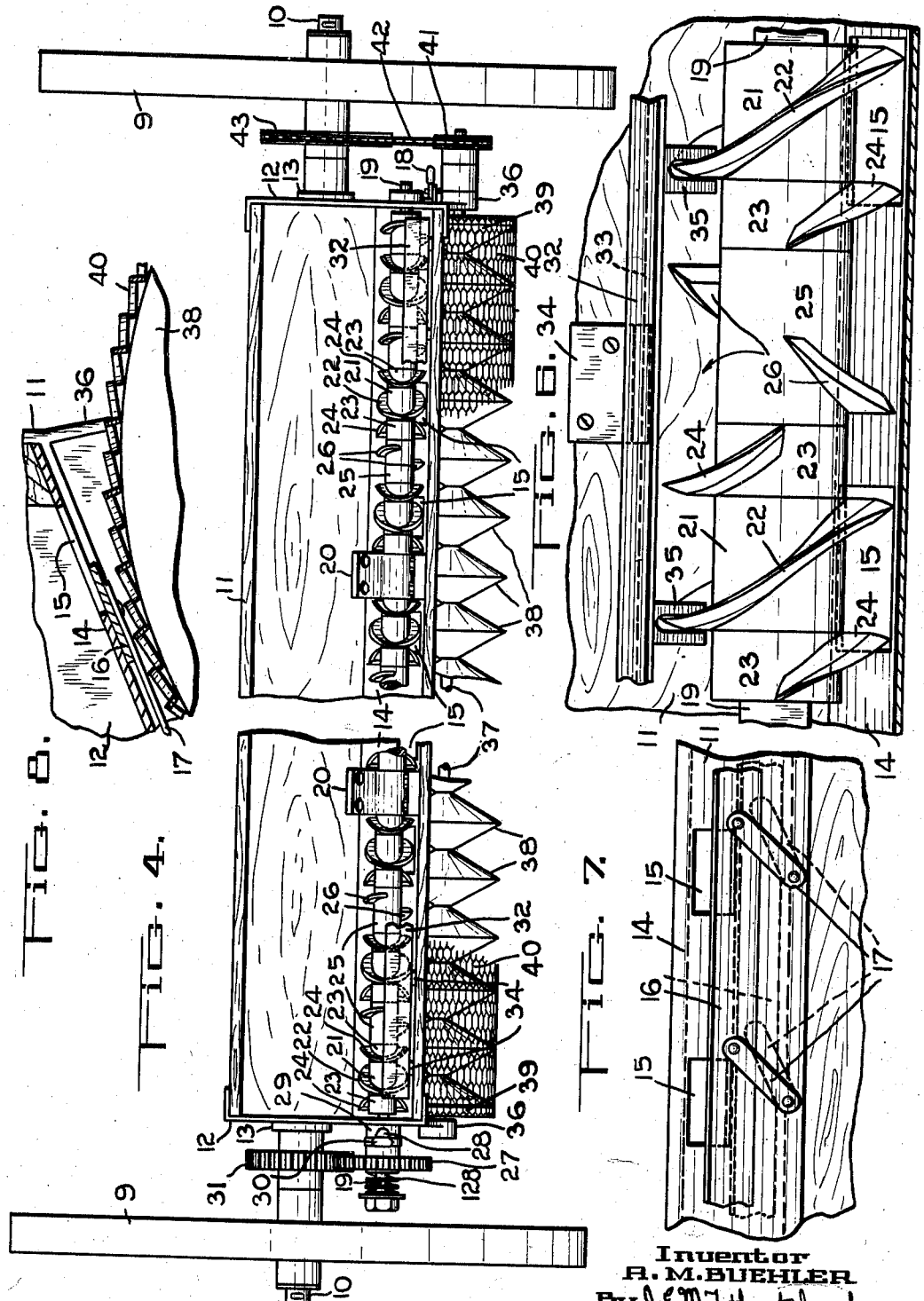
Inventor
A. M. BUEHLER
By J.E.M.Fetherstonhaugh
Attorney Patented Jan. 17, 1939

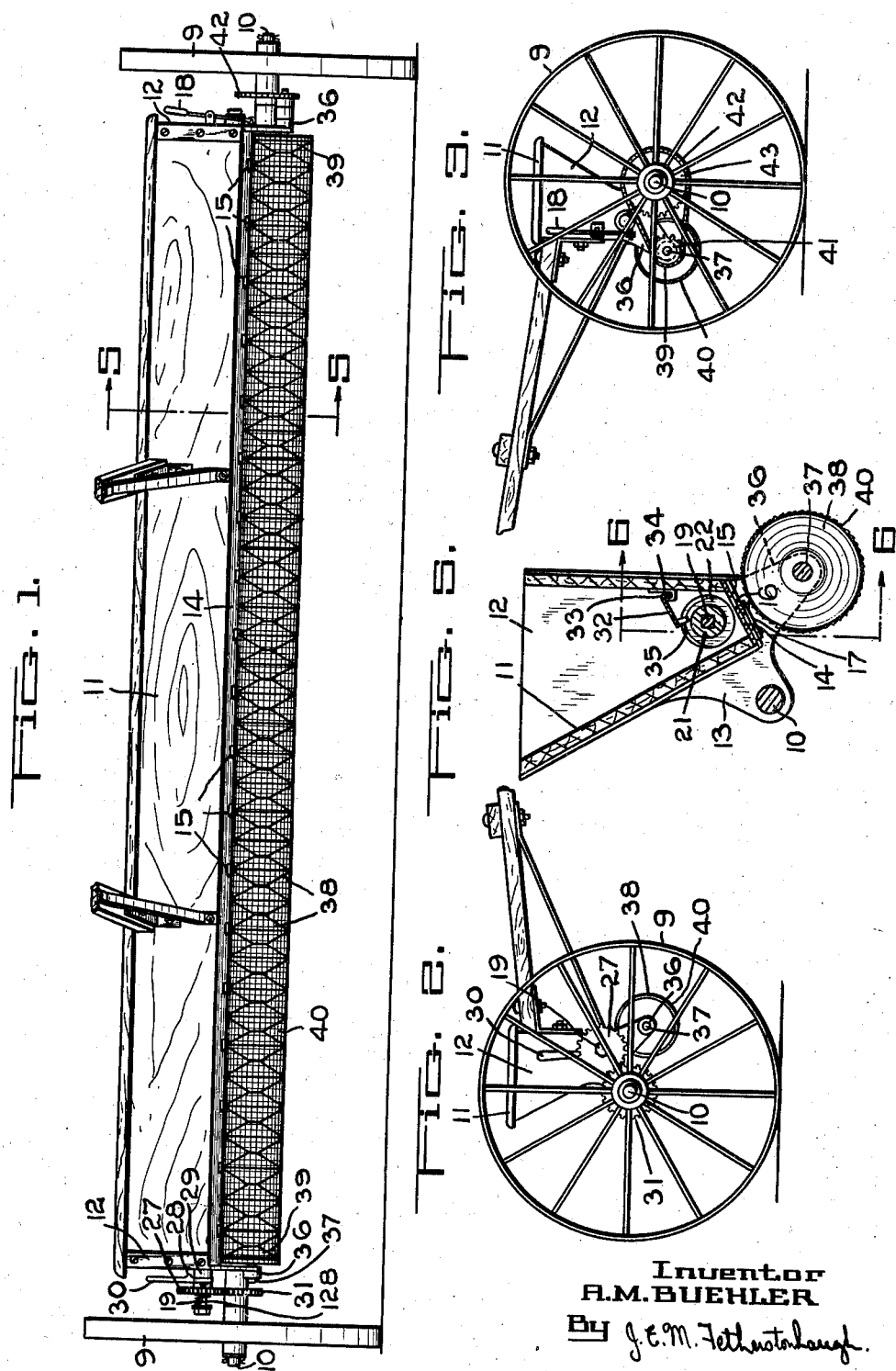

2,144,142

UNITED STATES PATENT OFFICE 2,144,142

MATERIAL DISTRIBUTING APPARATUS

Allan Moyer Buehler, Preston, Ontario, Canada

Application February 25, 1937, Serial No. 127,716

2 Claims. (Cl. 221—120)

My invention relates to improvements in material distributing apparatus particularly of the kind employed for distributing fertilizer or other material in finely divided form on the soil and an object of my invention is to devise an improved feed for such an apparatus which will efficiently agitate the material to be distributed and impel it towards the discharge orifices in order to ensure that such feed shall be constant and uniform.

A further object is to devise an improved spreader for the material fed from the feeding mechanism which will distribute such material broadcast and uniformly on the soil over which the apparatus is driven.

A still further object is to construct an apparatus which will be simple in construction, comparatively inexpensive to manufacture and which can be operated with the minimum of power.

With the above and other objects in view which will hereinafter appear as the specification proceeds, my invention consists, in its preferred embodiment, of the construction and arrangement all as hereinafter described and illustrated in the accompanying drawings in which:

Fig. 1 represents a front elevation of my apparatus.

Fig. 2 is an end elevation viewed from the end of the apparatus from which the feed mechanism is driven.

Fig. 3 is an end elevation viewed from the end of the aparatus from which the spreader mechanism is driven.

Fig. 4 is a top plan view of the apparatus drawn to an enlarged scale and broken away intermediately of its length, the lid of the material containing hopper having been removed to show the feeding mechanism.

Fig. 5 is a vertical cross-section through the line 5—5 (Fig. 1), but drawn to the enlarged scale of Fig. 4.

Fig. 6 is a fragmentary vertical longitudinal section of a portion of the material containing hopper drawn to a considerably enlarged scale and illustrating the construction of the agitating means of the material feed mechanism, such section being taken on the line 6—6 (Fig. 5).

Fig. 7 is a fragmentary inverted plan view of a portion of the material containing hopper bottom showing the material discharge outlets and adjustable means for varying their area, and Fig. 8 is an enlarged fragmentary section similar to Fig. 5 showing the bottom of the material containing hopper and the spreader cylinder construction.

Like characters of reference indicate corresponding parts in the different views.

My apparatus, as illustrated, comprises a pair of spaced apart wheels 9, each secured to an end of an axle 10. The material containing hopper 11 has its end members 12 supported on the axle 10 by the latter extending freely through depending brackets 13 formed on the end members 12, and such hopper 11 has an inclined bottom 14 provided with material discharge outlets or slots 15.

The area of such discharge slots 15 may be varied by providing an underlying longitudinally movable plate 16 hinged by links 17 to the bottom 14 of the hopper so that by moving the plate 16 longitudinally in one direction by means of a lever 18 it will cover the discharge slots 15 and by moving it in the reverse direction it will uncover the same. By suitably positioning the lever 18 any intermediate adjustment may be obtained.

The material feeding and agitating mechanism in the hopper 11 preferably comprises a longitudinal shaft 19 journalled in the hopper end members 12, and intermediate bearings 20 may also be provided. On such shaft 19 gangs of material agitating and feeding members are secured to rotate therewith, for instance, by the shaft 19 being of square cross-section. Each gang of members consists of a main material feeding member 21 with an angularly disposed disc-like flange or continuous flight 22 thereon curved in both directions to move the material longitudinally in both directions over the discharge slots 15 when the shaft is rotated in the direction of the arrow (Fig. 6).

One each side of each member 21 is provided a member 23 with an angularly disposed rib or flight 24 extending outwardly therefrom halfway around the periphery. Between each gang of members 23, 21, 23, is an additional member 25 similarly secured on the shaft 19 and with angularly disposed spaced apart ribs or flights 26 extending outwardly from its periphery and oppositely disposed to the flights of the members 23, 21, 23.

The shaft 19 is so located in the hopper that the members 21 are immediately above the material discharge slots 15 and the action of such members 23, 21 and 23 of each gang and the members 25 as the shaft 19 is rotated is to agitate the material back and forth longitudinally in the hopper as well as in a rotary direction, the members 21 additionally assisting in feeding the material down through the slots 15.

If desired, each gang of members 23, 21, 23, and their adjacent member 25 may well be formed integrally instead of separately as illustrated. Such integral construction, however, would in no way affect or vary the operation of a gang.

The shaft 19 may be driven from the axle 10 or a wheel 9. As illustrated, a gear wheel 27 is slidably secured on an end of the shaft 19 protruding exteriorly of a hopper end member 12 and has a pawl element 28 thereon normally springheld by a spring 128 in a slotted element 29 on the shaft 19. An operating lever 30 is provided on the pawl element for actuating the pawl out of the slot to throw the gear wheel 27 into and out of mesh with gear wheel 31 secured on the axle 10. Consequently when the apparatus is drawn over the soil, on reference to Fig. 2, it will be seen that the wheels 9 and attached gear wheel 31 on axle 10 rotate in a clockwise direction and the gear wheel 27 on the shaft 19 and the shaft 19 will rotate in a counter-clockwise direction or the direction indicated by the arrow in Fig. 6 when such gears 27 and 31 are in mesh thus rotating the gangs of members 23, 21, 23 and the interposed members 25.

In addition to the material agitating means provided in the feeding mechanism an inclined agitator plate 32 extends longitudinally in the hopper 11 above the gangs of members 23, 21, 23, its forward edge 33 being downwardly turned and received in hooks 34 secured to the front wall of the hopper 11. Thus the agitator plate is hinged at its forward edge to the hopper, such construction permitting the plate to be reciprocated in a longitudinal direction. In order to effect such reciprocation depending forked elements 35 are secured to the agitator plate 32 in the vicinity of its lower rear edge and these forks straddle the flights 22 of the members 21. Consequently when the shaft 19 and members 21 are rotated the agitator plate 32 is moved back and forth longitudinally imparting an agitating action to the material in the hopper overlying the same. The forks 35 also serve to clean the flights 22 and prevent the material from packing therearound.

The hopper end members 12 are also provided with depending brackets 36 extending somewhat in a forward direction and constituting bearings for a spreader shaft 37 extending longitudinally in front of the hopper 11. On this shaft are provided a plurality of circular members 38 with opposed conical faces and end members 39 secured to the shaft 37. About these members 38 and 39 is disposed a cylindrical mesh screen 40 which well may be made of expanded metal secured to the peripheries of the members 38 and 39 by soldering, brazing or spot-welding. Thus the screen 40 and the members 38 and 39 all rotate with the shaft 37. An end of the shaft 37 protrudes beyond a bracket 36 and is provided with a sprocket wheel 41 connected by a chain 42 with a sprocket wheel 43 on the axle 10. Thus, upon the apparatus being drawn over the soil, the spreader screen 40 is continuously rotated.

In operation, as above described when the apparatus is being drawn and, assuming that the gear 27 is in mesh with the gear 31, the shaft 19 and the gangs of members 23, 21, 23 and the interposed members 25 are rotated, agitating the material back and forth and rotarily over the slots 15 with the result that the material is prevented from cloying and is fed down through such slots 15 from the hopper 11 onto the spreader screen 40.

The reciprocated agitator plate 32 on the hopper, in addition to agitating the material, directs it down towards the bottom of the hopper but substantially in the vicinity of its rear wall.

When the material drops onto the rotating spreader screen 40 some of it is deflected off the screen, but the greater proportion goes therethrough onto the opposed conical face members from whence it is projected through the screen again onto the ground. The screen and members 38 and 39 spread the material broadcast and evenly over the surface of the soil.

An apparatus of the construction above described incorporating my material feeding mechanism and spreading mechanism is particularly effective for distributing fertilizers, such as cyanamid or other substances which are light and have a tendency to cloy. However, my apparatus can be used for broadcast distribution of any finely divided material and if my spreader mechanism is replaced by drills it can be employed for distributing fertilizers or other material in rows or otherwise as desired.

What I claim as my invention is:

1. In a material distributing apparatus, the combination with a material hopper having material discharge orifices, of rotatable material feed mechanism in the hopper comprising a longitudinal rotatable shaft in the hopper, a plurality of gangs of agitating members disposed axially on the shaft, each gang including a central member with an angularly disposed continuous flight therearound curved in both directions, and a flanking member on each side of the central member with an angularly disposed flight extending substantially half-way round its periphery, the flight on one flanking member being disposed on the opposite half of the periphery to that on the other flanking member, and an additional member secured axially on the shaft between each gang of members and with spaced apart flights thereon disposed angularly oppositely to the flights of the members of each gang.

2. In a material distributing apparatus, the combination with a material hopper having material discharge orifices, of rotatable material feed mechanism in the hopper comprising a longitudinal rotatable shaft in the hopper, a plurality of gangs of agitating members disposed axially on the shaft, each gang including a central member with an angularly disposed continuous flight therearound curved in both directions, and a flanking member on each side of the central member with an angularly disposed flight extending substantially half-way round its periphery, the flight on one flanking member being disposed on the opposite half of the periphery to that on the other flanking member, an additional member secured axially on the shaft between each gang of members and with spaced apart flights thereon disposed angularly oppositely to the flights of the members of each gang, a rearwardly and downwardly inclined agitator plate longitudinally disposed in the hopper and overlying the gangs of agitating members, said agitator plate loosely hinged to the hopper and capable of longitudinal movement therein, and an operative connection between the agitator plate and the flight of a central agitating member for reciprocating such agitator plate upon rotation of the central member.

ALLAN MOYER BUEHLER.